(12) United States Patent
Kandori et al.

(10) Patent No.: US 6,800,844 B2
(45) Date of Patent: Oct. 5, 2004

(54) TWO-DIMENSIONAL OPTICAL SCANNER AND METHOD OF DRIVING THE SAME

(75) Inventors: Atsushi Kandori, Kanagawa (JP); Masao Majima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 10/157,971

(22) Filed: May 31, 2002

(65) Prior Publication Data

US 2003/0015652 A1 Jan. 23, 2003

(30) Foreign Application Priority Data

Jun. 4, 2001 (JP) ........................................ 2001-168745

(51) Int. Cl.[7] .................................................. H01J 3/14
(52) U.S. Cl. ........................ 250/234; 250/235; 358/494
(58) Field of Search ................................. 359/201–202, 359/212, 223–224; 250/234–235; 358/474, 494; 347/225, 231

(56) References Cited

U.S. PATENT DOCUMENTS

| | | | | |
|---|---|---|---|---|
| 3,717,772 A | * | 2/1973 | Engman ..................... | 250/235 |
| 3,919,527 A | * | 11/1975 | Bowen et al. ......... | 235/462.36 |
| 5,150,249 A | * | 9/1992 | Montagu .................... | 359/202 |
| 5,606,447 A | | 2/1997 | Asada et al. ............... | 359/199 |
| 5,691,535 A | * | 11/1997 | Boutet ........................ | 250/234 |
| 5,767,666 A | | 6/1998 | Asada et al. ................. | 324/97 |
| 6,285,489 B1 | * | 9/2001 | Helsel et al. .............. | 359/291 |
| 6,603,588 B2 | * | 8/2003 | Hagelin et al. ............. | 359/212 |

FOREIGN PATENT DOCUMENTS

| | | |
|---|---|---|
| JP | 2657769 B2 | 6/1997 |
| JP | 2722314 B2 | 11/1997 |

* cited by examiner

*Primary Examiner*—Stephone B. Allen
*Assistant Examiner*—Patrick J. Lee
(74) *Attorney, Agent, or Firm*—Fitzpatrick, Cella, Harper & Scinto

(57) ABSTRACT

A two-dimensional image is displayed by causing a light beam scanning in a horizontal direction x to also scan in a vertical direction y. First photo-detector P is arranged in a region where the scan speed of the light beam in the first direction x is highest and the scan speed of the light beam in the second direction y is lowest, whereas second photo-detector Q is arranged in a region where the scan speed of the light beam in the second direction y is highest and the scan speed of the light beam in the first direction x is lowest so that both of the photo-detectors can accurately detect the scan timing of the light beam. Any possible error of synchronism of the horizontal scan of the light beam and the vertical scan of the light beam can be prevented by using the signals from the photo-detectors P, Q.

19 Claims, 14 Drawing Sheets

DETECTION SIGNAL FROM FIRST DETECTING ELEMENT

DETECTION SIGNAL FROM SECOND DETECTING ELEMENT

DETECTION SIGNAL FROM FIRST
DETECTING ELEMENT

DETECTION SIGNAL FROM SECOND
DETECTING ELEMENT

DRIVE SIGNAL

SAW-TOOTH-WAVE DRIVE

TIME

DRIVE SIGNAL

SINUSOIDAL DRIVE

TIME

SCAN CHARACTERISTIC OF
FIRST OPTICAL POLARISCOPE

SCAN CHARACTERISTIC OF
SECOND OPTICAL POLARISCOPE

SCAN CHARACTERISTIC OF
TWO-DIMENSIONAL OPTICAL
SCANNER

TWO-DIMENSIONAL OPTICAL SCANNER AND METHOD OF DRIVING THE SAME

BACKGROUND OF THE INVENTION

1. Field of the Invention

This invention relates to a two-dimensional optical scanner adapted to display a two-dimensional image by causing a beam of light that is scanning in a direction to also scan in a second direction. An optical scanner according to the invention can find various applications for displaying two-dimensional images. The present invention also relates to a method of driving such a two-dimensional optical scanner.

2. Related Background Art (1) Two-dimensional optical scanners adapted to cause a beam of light to scan by means of an optical deflector and display an image have been and are being popularly utilized.

(2) FIG. 10 of the accompanying drawings schematically illustrates the structure of a known two-dimensional optical scanner of the type under consideration. The optical scanner comprises a light source 1 provided with a modulation means, a first and second optical deflectors A, B for deflecting a beam of light emitted from the light source and an emission correcting optical system 40. It is adapted to display a two-dimensional image by causing a beam of light that is scanning in x-direction to also scan in y-direction.

(3) Galvano-mirrors or similar devices that can temporally change the rate of angular displacement are normally used for the optical deflectors A, B. Such an optical deflector will be discussed in greater detail below.

Normally, a galvano-mirror is used for the optical deflector, which is driven by a saw-tooth wave signal as shown in FIG. 11A so that the displacement of the galvano-mirror may change linearly relative to the scanning time. Alternatively, the optical deflector may be driven by a sinusoidal signal as shown in FIG. 11B. Then, the rate of angular displacement of the optical deflector also changes with time.

In recent years, micro-optical deflectors (micro-mirrors) having a mirror angle of several millimeters have been realized (Japanese Patent Registration Publication No. 02722314) by utilizing techniques for processing silicon that is a semiconductor. FIG. 12 of the accompanying drawings is a schematic plan view of such an optical deflector (galvano-mirror), illustrating its structure. Referring to FIG. 12, there are shown a silicon substrate 50, an upper glass substrate 51, a lower glass substrate 52, a movable plate 53, a torsion bar 54, a planar coil 55, a total reflection mirror 56, an electrode terminal 57 and permanent magnets 60 through 63. The optical deflector is of the electro-magnetic type. A drive current is made to flow to the planar coil 55 so as to drive the device by means of the permanent magnets and Lorenz force (as will be described in greater detail hereinafter). A number of micro-mirrors of the electrostatic type and those of the piezoelectric type have also been proposed to date.

The illustrated optical deflector, however, can be driven only by a sinusoidal signal because it is operated by utilizing the resonance of the mirror at or near the resonance frequency of the latter. When a pair of galvano-mirrors or resonant optical deflectors are driven by a sinusoidal signal to display a two-dimensional image by way of raster scan, the scan speed of the light beam is high at and near the center of the image but that of one of the optical deflectors is reduced to nil in a peripheral area of the image and eventually the sense of speed becomes inverted. FIGS. 13A to 13C show the scanning characteristics of such an arrangement. For the above described reason, only a central area of the projection surface where the scan speed of the light beam can be held substantially to a constant level if corrected by an optical system is used for displaying images. In other words, the remaining peripheral area of the surface is not used for image display and hence it is an unnecessary area. Additionally, a galvano-mirror or a resonant optical deflector that is driven by a sinusoidal signal is so designed that the scan time in a positive direction is made equal to the one in the opposite direction. Therefore, when such a device is used to display an ordinary television image or a computer image, only the positive scan direction or the opposite scan direction is used, or if the two scan directions are used, the image information is processed and rearranged.

Now, a one-dimensional optical scanner will be discussed below.

FIG. 14 of the accompanying drawings schematically illustrates an ordinary one-dimensional optical scanner that is a laser beam printer comprising a polygon mirror 70. Referring to FIG. 14, a mirror (synchronism detecting mirror) 71 is arranged in a peripheral area of the image region so that the scanning light beam may be reflected by it and the light beam reflected by the mirror 71 may be detected by a photo-detector 72 for detecting synchronism in order to detect the drive timing for each scan cycle. In FIG. 14, reference symbol 73 denotes a light source provided with a modulation means and reference symbol 74 denotes an emission correcting optical system, while reference symbol 75 denotes a photosensitive drum.

(4) Meanwhile, with an optical scanner of the above described type, it is necessary to monitor the drive cycle and the drive timing of the optical deflector. This will be discussed below.

In the case of a two-dimensional optical scanner, when the optical deflectors are not synchronized for operation, the image displayed by the scanner can become distorted, and in the worst instance, may appear as if it were incessantly drifting. Obviously, the quality of such an image is low. However, the drive cycle and the drive timing of each of the optical deflectors are not constant but can vary as a function of ambient temperature and other operating conditions. In other words, if the optical deflectors are synchronized for operation once, it does not necessarily mean that they operate synchronously since then. Therefore, the actual drive cycle and the actual drive timing of each of the optical deflectors need to be constantly monitored so as to make them operate in a satisfactorily synchronized manner. Additionally, the two-dimensional image needs to be displayed in the corrected region of the emission correcting optical system and hence the actual drive cycle and the actual drive timing of each of the optical deflectors need to be constantly monitored from this point of view.

(5) However, while a one-dimensional optical scanner scans with a constant angular velocity, the optical deflectors such as galvano-mirrors used in a two-dimensional optical scanner are of the type where the rate of angular displacement changes with time. Therefore, the detection technique that is used in the one-dimensional optical scanner is not enough for the two-dimensional optical scanner. Japanese Patent Publication No. 2657769 discloses methods of detecting the angle of displacement of a galvano-mirror. They include the following.

(1) a method that utilizes a detection coil (see FIGS. 15A and 15B)

(2) a method that utilizes light (see FIG. 16)
(3) a method that utilizes an electrostatic capacitance (see FIG. 17).

These proposed methods will be discussed below.

FIGS. 15A and 15B of the accompanying drawings illustrate in detail (particularly the displacement detecting section of) a micro-optical deflector (galvano-mirror) prepared by using the micro-mechanics technology. The galvano-mirror has a three-layered structure formed by an upper and lower glass substrates 51, 52 and a silicon substrate 50 that is sandwiched by the glass substrates as shown in FIG. 13B. A flat movable plate 53 is swingably supported by the silicon substrate 50 by way of a torsion bar 54. A total reflection mirror 56 is formed at the center of the upper surface of the movable plate 53 by means of an evaporation technique and adapted to reflect a laser beam. On the other hand, a planar coil 55 is formed along the periphery of the movable plate 53 and permanent magnets 60 through 63 are arranged along a pair of opposite edges of the movable plate 53 so that the movable plate 53 and the total reflection mirror 56 are driven to swing when a drive current is made to flow through the planar coil 55. Additionally, detection coils 81, 82 are arranged on the lower glass substrate 52 at the respective positions illustrated in FIG. 15A so that the angle of displacement of the movable plate 53 can be detected as the change in the voltage signal output as a function of the mutual inductance is detected in terms of differential.

On the other hand, the arrangement of FIG. 16 is adapted to apply a light beam 91 to the rear side of reflector 93 for the purpose of detecting the angle of displacement and receive the reflected light beam by means of a PSD 92. The angle of displacement of the reflector 93 is detected by referring to the light receiving position of the PSD 92. Finally, the arrangement of FIG. 17 comprises a pair of electrodes 100, 101 disposed at opposite ends of the rear side of reflector 93 and another pair of electrodes 102, 103 disposed respectively vis-à-vis the electrodes 100, 101 to produce capacitors C1, C2. The angle of displacement of the reflector 93 is detected by referring to the difference of the capacitances of the capacitors C1, C2.

However, the operation characteristics of the sensor are vital when the angle of displacement is to be detected by means of a detection coil (FIGS. 15A and 15B) or electrostatically (FIG. 17). In other words, an offset can occur due to changes in the temperature characteristics and/or the positional error that can be produced when assembling the substrates. Then, the operation characteristics of the sensor have to be observed in advance in order to accurately detect the angle of displacement. When, on the other hand, the angle of displacement is to be detected optically (FIG. 16), it is very difficult to regulate the relative positions of the detection light source 90, the mirror 93 and the PSD 92 because of the long light path. Therefore, the PSD 92 is required to have a high positional resolution. Furthermore, with any of the above described known methods, it is not possible to accurately monitor the condition of the scanning light beam that is affected by the possible distortion and/or shift from the axis of revolution of the mirror because the methods are not adapted to directly detect the scanning condition of the light beam. Thus, it is highly difficult for an image display to display a high quality image only by using any of the above detection methods.

Therefore, it is the object of the present invention to provide a two-dimensional optical scanner that can ensure the monitoring operation of the photo-detector and effectively prevent degradation of the displayed image and a method of driving such an optical scanner.

SUMMARY OF THE INVENTION

The present invention is made in view of the above identified circumstances. According to the invention, there is provided a two-dimensional optical scanner adapted to display a two-dimensional image by causing a light beam scanning in a first direction to scan also in a second direction;

at least the scan speed of the light beam in said first direction changes in each scan cycle;

a first photo-detector for detecting the scanning light beam being arranged in a region where the scan speed of the light beam in said first direction is substantially equal to the highest speed thereof.

BRIEF DESCRIPTION FO THE DRAWINGS

DETAILED DESCRIPTION OF THE INVENTION

Now, the present invention will be described by referring to FIG. 1 through FIGS. 7A and 7B of the accompanying drawings that illustrate preferred embodiments of the invention.

Figure 1:
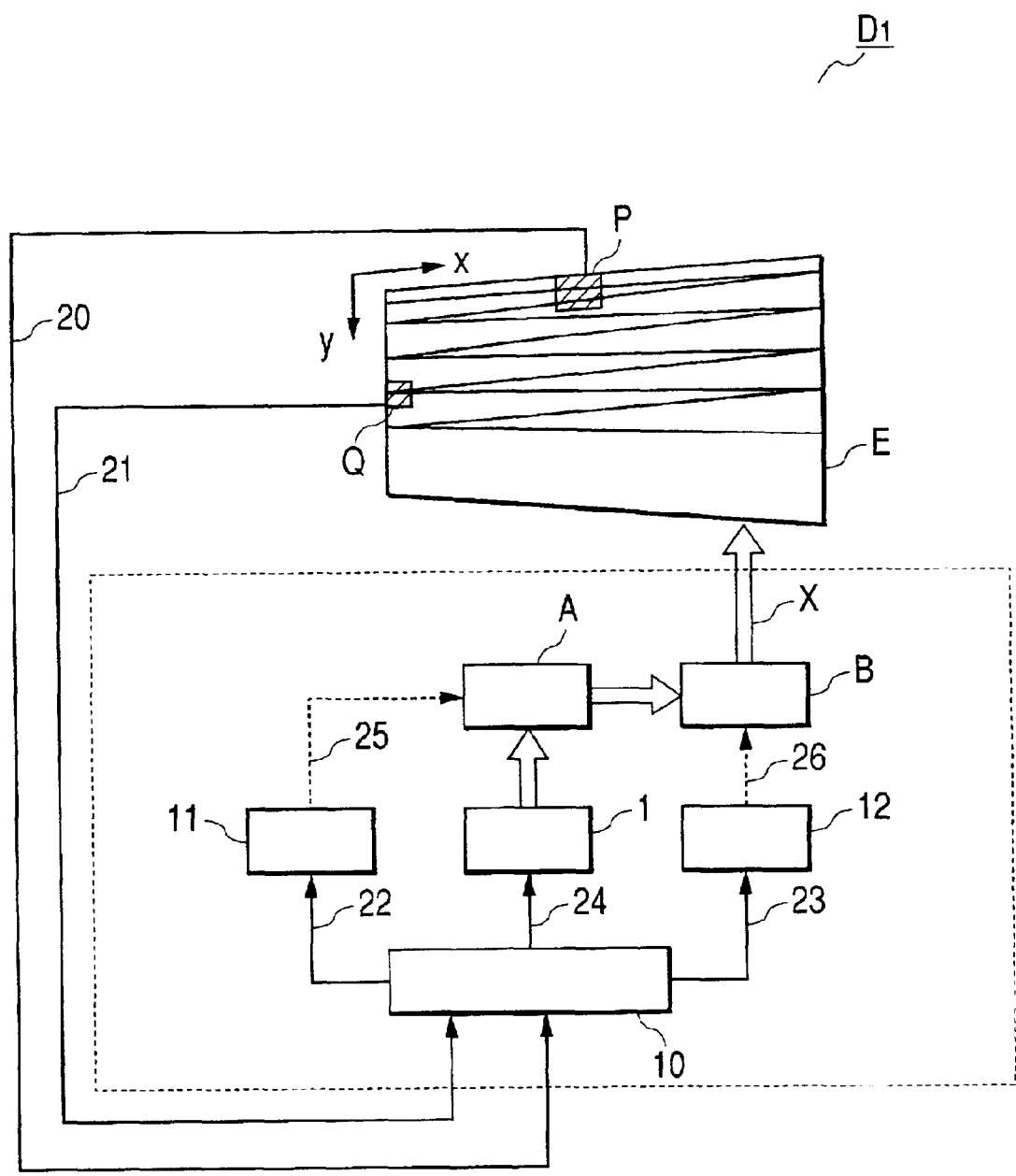
FIG. 1 is a schematic block diagram of a two-dimensional optical scanner according to the invention, illustrating the overall configuration thereof.

Referring firstly to FIG. 1, a two-dimensional optical scanner (image display apparatus) according to the invention is adapted to display a two-dimensional image by causing a light beam scanning in a first direction x to also scan in a second direction y.

It is sufficient for the light beam to be emitted from a light source (see reference symbol 1 in FIGS. 1 and 2) that is provided with a modulation means. The light beam emitted from the light source 1 is deflected by a first optical deflector A so as to scan in the first direction x. Similarly, the light beam emitted from the light source 1 is deflected by a second optical deflector B so as to scan in the second direction y. In the following description, first optical deflectors will be denoted by reference symbols A1, A2, . . . if they need to be structurally discriminated from each other, whereas they will be denoted commonly by reference symbol A if they do not need to be structurally discriminated from each other. Similarly, second optical deflectors will be denoted by reference symbols B1, B2, . . . if they need to be structurally discriminated from each other, whereas they will be denoted commonly by reference symbol B if they do not need to be structurally discriminated from each other.

According to the invention, the scan speed of the light beam emitted from the light source 1 is made to change in each scan cycle at least in said first scan direction x. The scan speed of the light beam may be made to change or remain constant in each scan cycle in said second scan direction y.

The timing of scan of the light beam in said first direction x is detected by a first photo-detector P that is adapted to detect the scanning light beam and arranged in a predetermined area. Since the scanning light beam is modulated according to image information in accordance with the detected timing, time precision of the detection is preferably within the drawing time for one pixel that is predetermined depending on the resolution of displayed images and scanning cycle, which are specified in the system specification of an image display apparatus. Now, the positional arrangement of the first photo-detector will be described below.

Generally, a photo-detector can detect a light beam (the scan speed of a light beam) depending on the sensitivity of the photo-detector. Hence a less sensitive photo-detector can detect only a light beam scanning at a low speed, whereas a more sensitive photo-detector can detect a light beam scanning at a high speed, when both light beams have the same amount of light. Therefore, for the purpose of the invention, it is necessary to arrange a first photo-detector in a position where it shows a sufficient sensitivity for detecting a light beam scanning at a required scan speed.

Figure 3A:
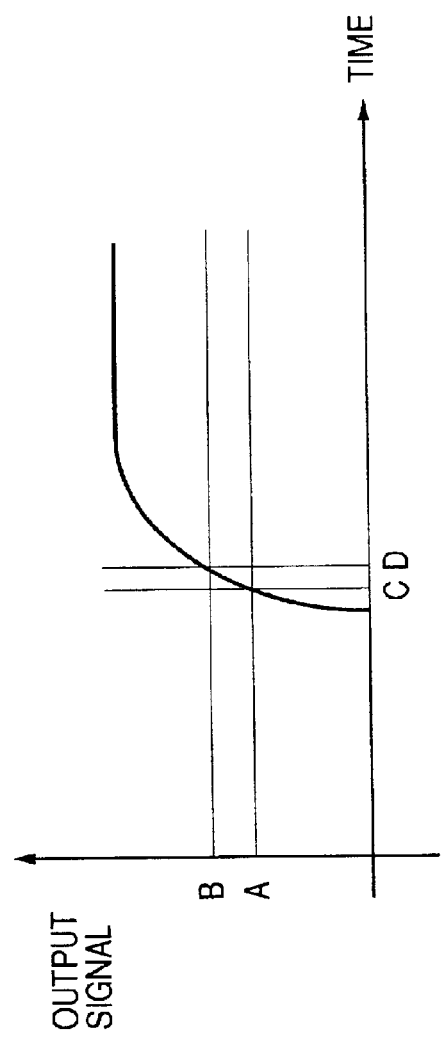
FIGS. 3A and 3B are graphs illustrating the principle of operation of a two-dimensional optical scanner.
Figure 3B:
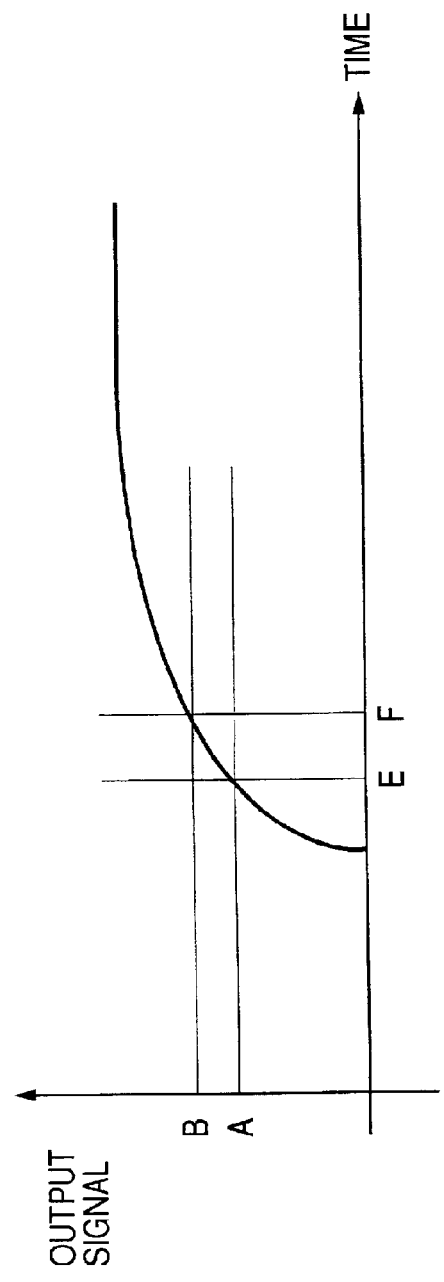

FIGS. 3A and 3B are graphs illustrating the change with time of the output of a photo-detector when a scanning light beam enters the photo-detector. The output of the photo-detector is nil before the light beam enters it. As the front end of the light beam enters the photo-detector, the output signal rises and the output signal becomes saturated when the light beam completely enters the photo-detector. The time span of the rising edge of the output signal can be determined by dividing the diameter of cross section of the light beam by the scan speed thereof.

As pointed out above, according to the invention, the scan speed of the light beam emitted from the light source 1 is made to change in each scan cycle at least in said first scan direction x. In other words, if the first photo-detector is arranged in an area where it can detect the scan speed of the light beam, the onset of the output signal changes with the scan speed of the light beam. FIG. 3A shows an output signal that is produced when the scan speed is high, whereas FIG. 3B shows an output signal that is produced when the scan speed is low.

As shown in FIG. 1, the output signal of the photo-detector P is either directly transmitted to signal processing circuit 10 or input to a comparator (not shown) arranged in the photo-detector so that a detection signal 20 may be generated and then transmitted to the signal processing circuit 10 only when the signal gets to a predetermined voltage.

Normally, noise is contained in the output signal of the photo-detector in a certain ratio. Noise can be generated by various causes including variance in the diameter of the cross section of the light beam, background noise of the photo-detector and fluctuations in the voltage in the detection circuit. Due to the noise, the voltage of the output signal is accompanied by a given magnitude AB of uncertainty as shown in FIGS. 3A and 3B. This means that the time span of the onset of the output pulse of the comparator involves an error whose magnitude is indicated by CD and EF in FIGS. 3A and 3B respectively.

Assume, for example, that the detection signal of the comparator for detecting the optical signal involves a noise with magnitude AB as shown in FIGS. 3A and 3B. The error of the detection time is relatively small as indicated by reference symbols CD in FIG. 3A if the scan speed of the light beam is high, whereas it is relatively large as indicated by reference symbols EF in FIG. 3B if the scan speed of the light beam is low. According to the present invention, the error in the detection signal is minimized to improve the accuracy of detection of the timing of scan of the light beam by arranging the first photo-detector P in a region where the scan speed of the light beam is highest in the first scanning direction (within the detectable range of the scan speed of the light beam).

If the optical deflector A to be used for scanning in the x-direction is a resonant optical deflector, it is driven to oscillate by a sinusoidal signal so that the scan speed is highest at the center of the traversing span of the scanning light beam. Therefore, the photo-detector is preferably placed at the center of the traversing span of the scanning light beam. However, since the scan speed is substantially constant at and near the center of the traversing span when the optical deflector is driven by a sinusoidal signal, the detector may be placed at any point within a range where the scan speed of the light beam can be regarded to be substantially equal to the highest speed thereof. The necessary time precision of the detection is determined from the drawing time for one pixel that is determined from the system specification of an image display apparatus, as described above. When the error in the detection signal is within the necessary time precision of the detection, time precision of the detection meets the requirement. In the case of a sinusoidal oscillation, since the scan speed is highest at the center of the traversing span of the scanning light beam, the error in the detection signal is minimum and thus needs to be set within the above-described time precision of the detection. However, even when the photo-detector is not placed at the center of the traversing span of the scanning light beam, the scan speed of the light beam can be regarded to be substantially equal to the highest speed thereof so far as change in the error in the detection signal is within the above-described time precision of the detection, so that the photo-detector can be placed at that position. For example, if only a central area of the surface scanned by the light beam is used as an image display region, the scan speed in the image display region is deemed to be constant and hence the light beam is made to carry image signals at regular time intervals for each and every pixel. Therefore, the error in the detection time is less than the time spent for each pixel regardless of the position of the detector within the traversing span of the x-direction in the image display region so that the detection accuracy is not affected by the position of the detector. Even if the optical deflector A is driven to oscillate by a signal other than a sinusoidal signal, the photo-detector can be placed at or near the position where the scan speed is highest within an area in which the light beam is modulated at regular time intervals by image signals. This is because change in the error in the detection signal does not badly become worse to satisfy the requirement to be within the above-described time precision of the detection, so that the scan speed of the light beam can be regarded to be substantially equal to the highest scan speed.

If the scan speed of the light beam is made to change in each scan cycle also in the second direction y, the first photo-detector P is preferably placed in an area where the scan speed of the light beam is lowest in the second direction y within the above defined region (where the scan speed of the light beam is highest in the first scanning direction within the detectable range of the scan speed of the light beam). In such an area, the light beam scanning in the x-direction can be detected consecutively for a plurality of times so that the error can be minimized by calculating the average.

Preferably, a second photo-detector Q is arranged independently from the first photo-detector P for the purpose of detecting the light beam and finding the timing of scan of the light beam in the second direction y.

If the scan speed of the light beam is made to change periodically also in the second direction y, the second photo-detector Q is preferably placed in an area where the scan speed of the light beam is highest in the second direction y and lowest in the first direction x within the detectable range of the scan speed of the light beam. With such an arrangement, the timing of scan of the light beam in the second direction can be detected accurately by the second photo-detector Q as in the case of the first photo-detector P.

Figure 2:
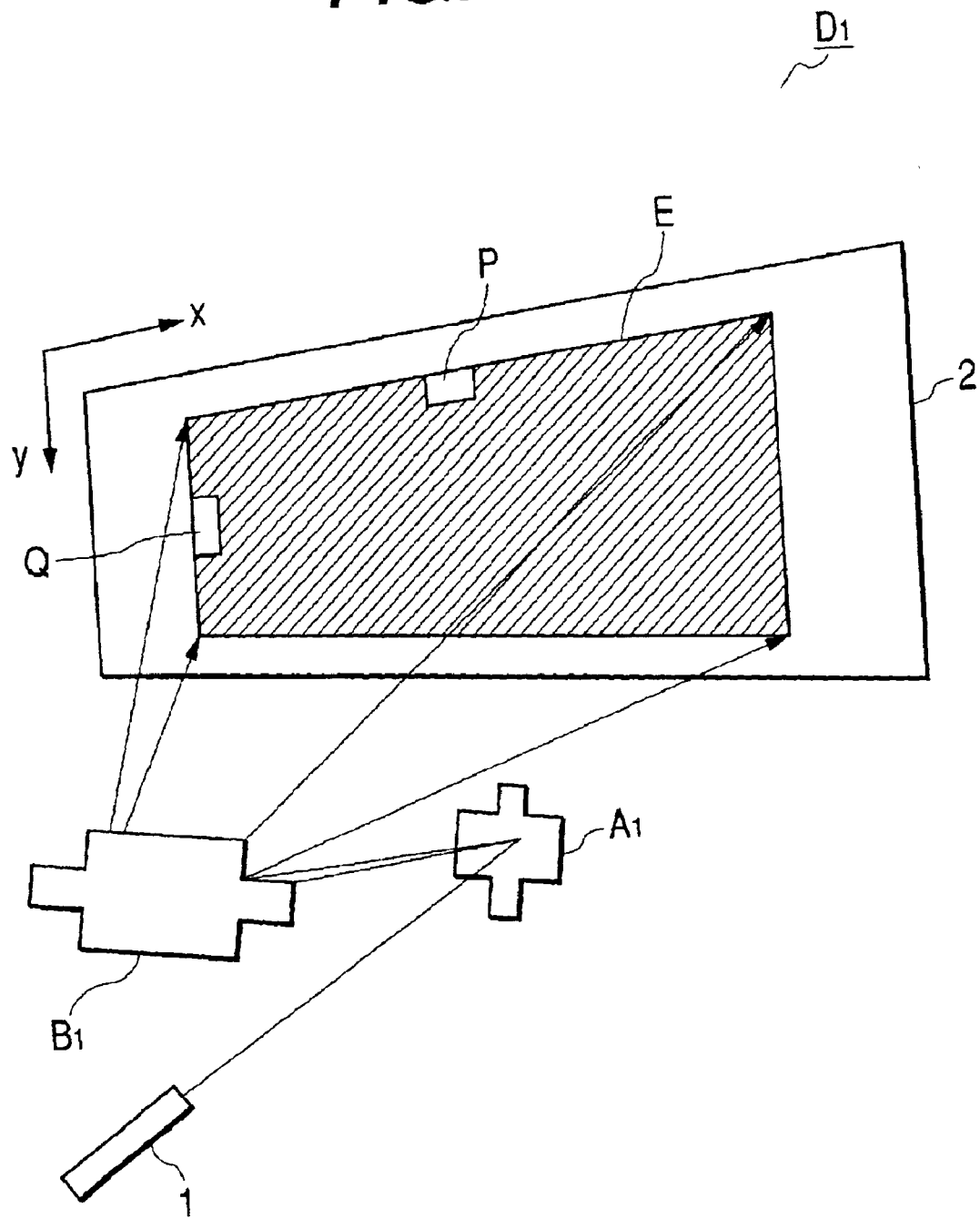
FIG. 2 is a schematic perspective view of a two-dimensional optical scanner according to the invention, illustrating the overall configuration thereof.

Meanwhile, said first photo-detector P and said second photo-detector Q that are arranged in an area subjected to the scan of the light beam may be placed on the surface where the two-dimensional image is displayed by the scanning light beam (the surface where the scanning light beam is projected as indicated by reference symbol 2 in FIG. 2);

between the surface 2 and the optical deflectors A and B; or between the first optical deflector A and the second optical deflector B.

In other words, both the photo-detector P and the photo-detector Q may be placed on the surface 2. Alternatively they may be placed between the surface 2 and the photo-detectors. Still alternatively, they may be placed between the first optical deflector A and the second optical deflector B. Furthermore, part of the optical deflectors may be placed on the surface 2 while the remaining optical deflectors may be placed at positions outside the surface 2 (e.g., between the surface 2 and the former photo-detectors or between the former optical deflectors). The photo-detectors may be placed at positions where they can detect the light beam reflected by mirrors or the like.

When arranging the photo-detectors P and Q on the surface 2, they may be placed in the image forming region E or outside the image forming region E. If they are placed outside the image forming region E, the light beam is required to scan the areas where the photo-detectors P and Q are arranged (outside the image forming region). This can be done typically by inputting modulation information to be used for detecting the light beam from the signal processing circuit 10 into the light source 1 at predetermined timings and irradiating the photo-detectors P and Q with a light beam for detecting the timing of scan (other than the light beam for displaying an image) (see FIG. 6).

Figure 7A:
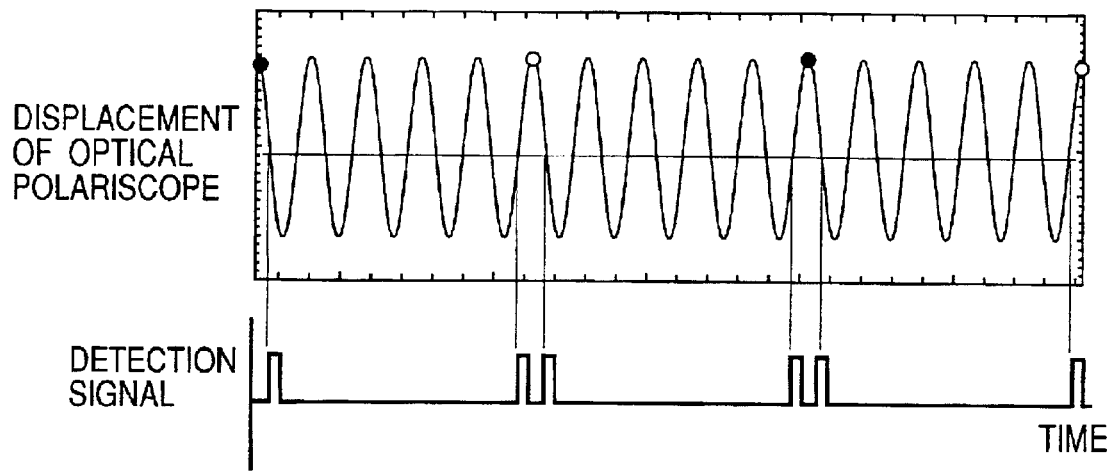
FIGS. 7A and 7B are graphs illustrating the effect of arranging a plurality of first and second photo-detectors.
Figure 7B:
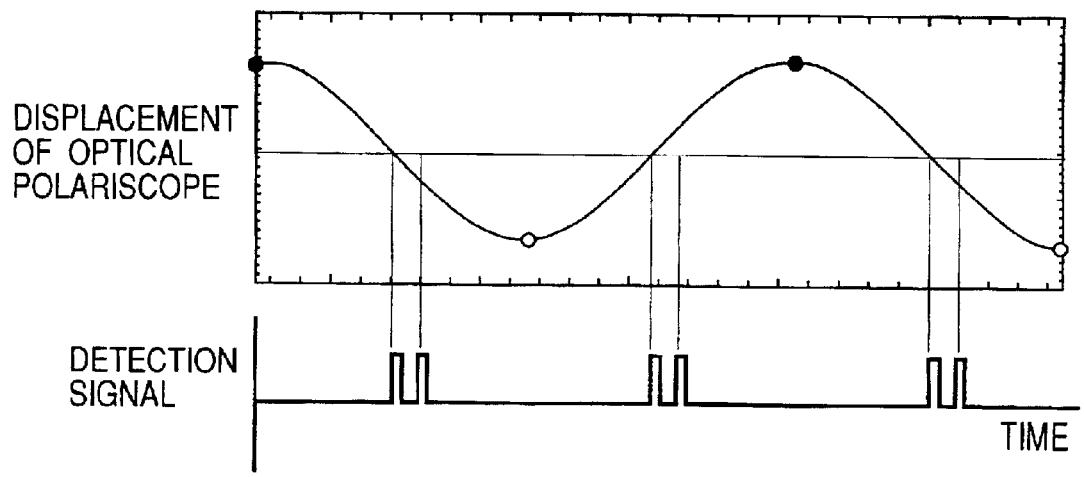

Alternatively, a plurality of first photo-detectors (see reference symbols P, R in FIG. 8) and a plurality of second photo-detectors (see reference symbols Q, S in FIG. 8) may be placed in respective areas where the scan speed of the light beam is detectable and becomes highest as viewed in the first direction x and the second direction y. With this arrangement, the timing of scan can be detected more accurately (FIGS. 7A and 7B). With this arrangement, the modulation information to be used for detecting the light beam is generated by the signal processing circuit 10 on the basis of the detected scan timing signals 20, 21. If the scan timing at the start of the scanning operation is not known, the modulation information to be used for detecting the light beam is generated on the basis of the initialized scan cycle and the phase difference between the input signal and the scan timing. Additionally, for the purpose of initially detecting the scan timing before modulating the image information at the start of a scanning operation, there may be provided a warming up period where modulation information for initially detecting an arbitrarily selected scan timing is input to the light source 1 having a modulation means to detect the scan timing and subsequently starting the modulating operation for displaying an image according to the modulation information supplied for displaying the image.

While the above described two-dimensional optical scanner comprises optical deflectors that are adapted to be driven by a sinusoidal signal and is designed to be used as a projection type image display apparatus, the application of the synchronism control method according to the invention is not limited such apparatus. The control method according to the invention is equally applicable to any two-dimensional optical scanners comprising at least an optical deflector in which the rate of angular displacement changes with time. Furthermore, it is equally applicable to projection type image display apparatus having a configuration other the one described above, projection type image recording apparatus, scanning type image plotting/processing apparatus, scanning type photo-detectors, etc.

For causing the scan speed of a light beam to cyclically change in the first direction, it is only necessary to make the rate of angular displacement of the first optical deflector A cyclically change (e. g., temporally change to draw a sinusoidal wave). Similarly, for causing the scan speed of a light beam to cyclically change in the second direction, it is only necessary to make the rate of angular displacement of the second optical deflector B cyclically change (e.g., temporally change to draw a sinusoidal wave). Optical deflectors that can be driven so as to temporally change the rate of angular displacement or those that are designed to change the rate of angular displacement with time may suitably used for the optical deflectors A and B of an optical scanner according to the invention. More specifically, optical deflectors to be used for the purpose of the invention may be selected galvano-mirrors (adapted to be driven by a sinusoidal signal) and resonant optical deflectors. For the purpose of cyclically changing the scan speed of the light beam both in the first direction x and in the second direction y, galvano-mirrors may be used for both the first optical deflector A and the second optical deflector B (see FIG. 2) or, alternatively, resonant optical deflectors may be used for both the first optical deflector A and the second optical deflector B (see FIG. 4). Still alternatively, a galvano-mirror may be used for one of the optical deflectors A and B, while a resonant optical deflector may be used for the other optical deflector. When the scan speed of the light beam is held constant in the second direction (without being changed cyclically), a polygon mirror whose rate of angular displacement can be regarded to be constant in a central area of the surface to be scanned or a galvano-mirror designed to be driven by a saw-tooth-wave signal may appropriately be used for the second optical deflector.

A high speed optical deflector adapted to cause a light beam to scan with a frequency of ten and several kHz to several tens kHz may be used for the first optical deflector A while a low speed optical deflector adapted to cause a light beam to scan with a frequency of several tens Hz to hundred and several tens Hz may be used for the second optical deflector B so that the optical scanner may be able to operate for raster scanning in a horizontal direction as shown in FIG. 1. Conversely, a low speed optical deflector may be used for the first optical deflector A while a high speed optical deflector may be used for the second optical deflector B so that the optical scanner may be able to operate for raster scanning in a vertical direction. Furthermore, scanning frequencies other than those listed above may be combined appropriately.

Figure 4:
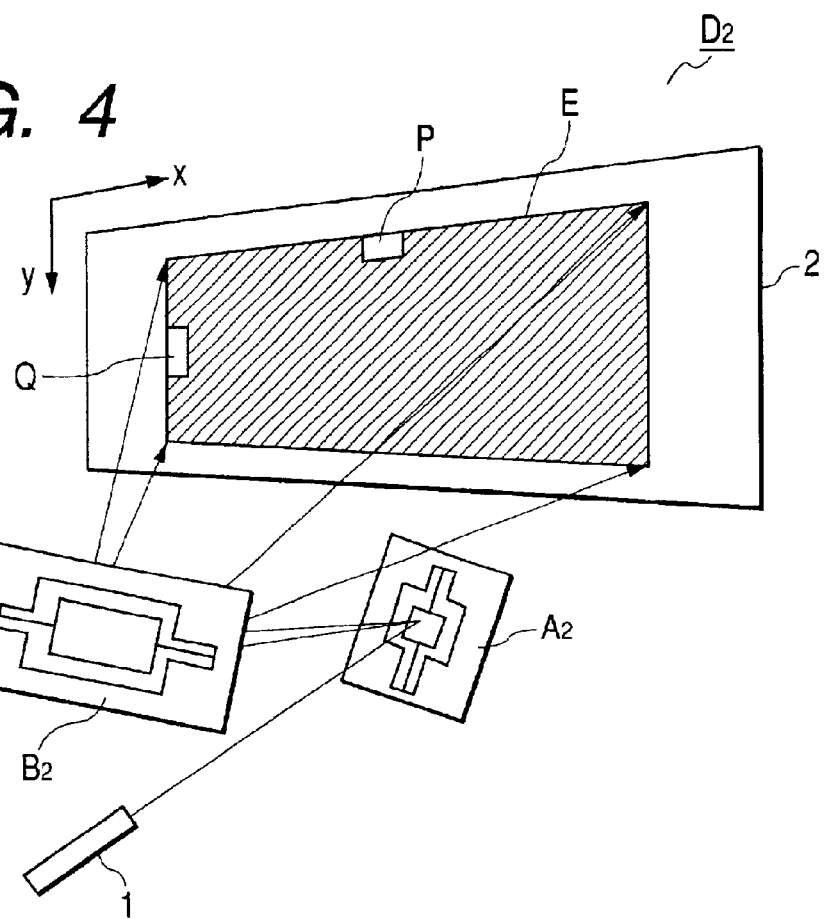
FIG. 4 is a schematic perspective view of a two-dimensional optical scanner according to the invention, illustrating the overall configuration thereof.
Figure 5:
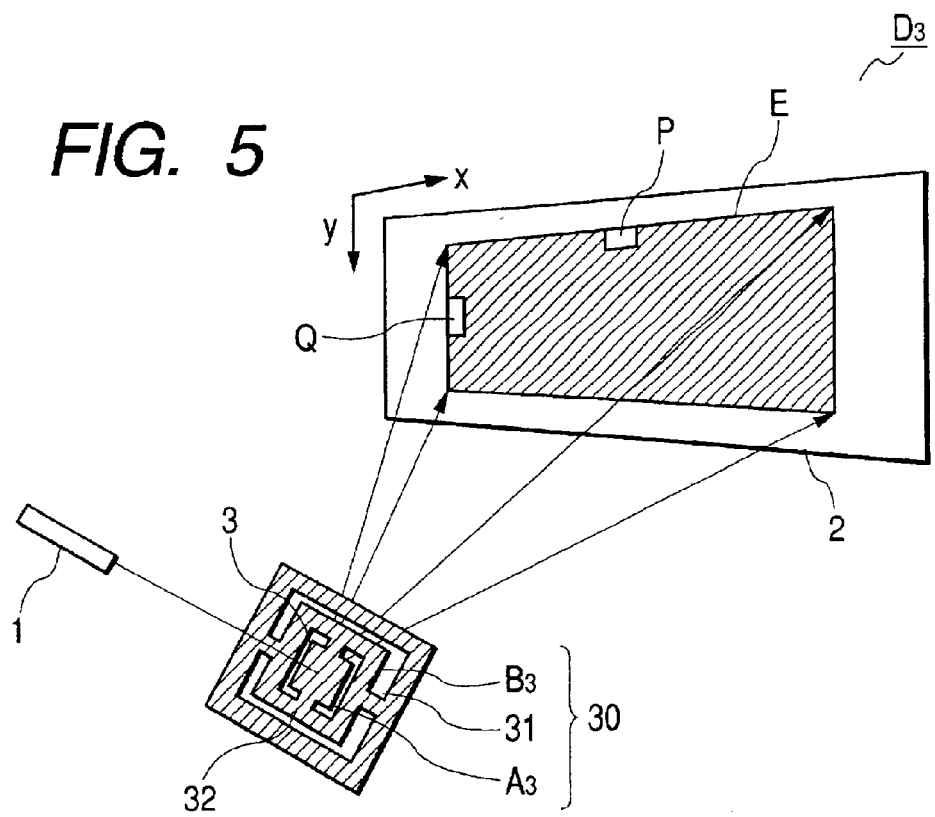
FIG. 5 is a schematic perspective view of a two-dimensional optical scanner according to the invention, illustrating the overall configuration thereof.
Figure 6A:
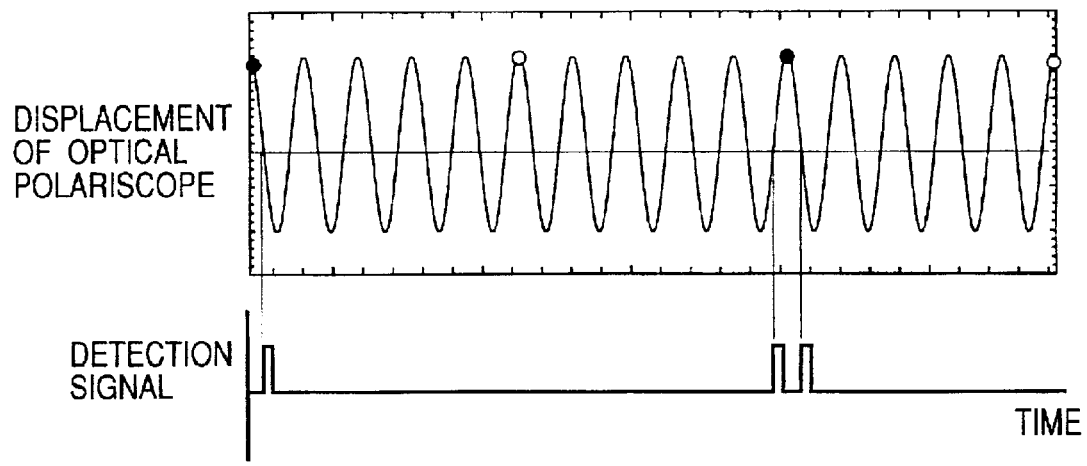
FIGS. 6A and 6B are graphs illustrating the operation of a two-dimensional optical scanner.
Figure 6B:
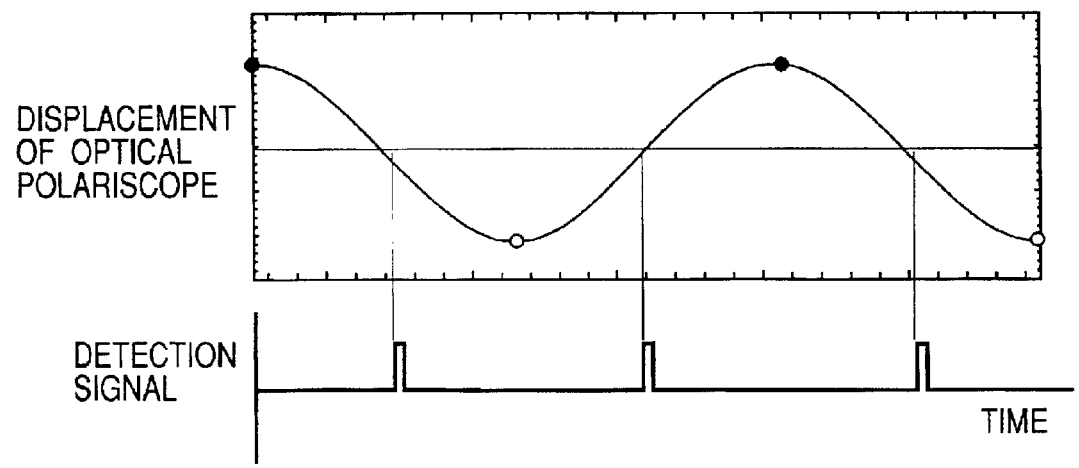

While the first optical deflector A2 and the second optical deflector B2 are arranged separately in FIG. 4, the arrangement of the first and second optical deflectors is by no means limited thereto. For example, they may be put together in a manner as shown in FIG. 5. Referring to FIG. 5, the optical deflection plane 3 is made swingable around a pair of axes (optical deflection axes that intersect each other orthogonally or non-orthogonally) 31, 32 and the first optical deflector A3 is adapted to cause the light beam to scan in a horizontal direction while the second optical deflector B3 is adapted to cause the light beam to scan in a vertical direction.

The optical deflectors may be those having a micro-mirror or those prepared by using a semiconductor processing technology.

Preferably, the photo-detectors P, Q are connected to a digital signal processing circuit 10 and the digital signal processing circuit 10 is by turn connected to the first drive means 11 for driving the first optical deflector A and the second drive means 12 for driving the second optical deflector B.

Light source devices that can be used for the light source 1 include those that can directly modulate the light beams such as laser diodes, LEDs and other semiconductor light-emitting devices as well as inorganic ELs, organic ELs and other electro-luminescence devices and those that can emit a light beam such as gas lasers and SHGs and are provided with a modulator. For displaying a color image, a plurality of light sources that can emit light beams of different wavelengths may be combined. If such is the case and only a set of optical deflectors are provided, the plurality of output light beams need to be put together to form a single light beam by an appropriate means such as an optical system. If, on the other hand, a plurality of sets of optical deflectors are used, it may be so arranged that the plurality of output light beams are made to strike respective mirrors.

If there is a risk that the light path between the second optical deflector B and the image display region E shifts as a result of the operation of scanning the light beam of the second optical deflector B and consequently the focal point is displaced in the image display region E, preferably an emitted light beam correcting optical system is arranged in the light path to correct the displacement of the focal point, if any. Such an emitted light beam correcting optical system may be obtained by combining an f-θ lens for correcting the displacement of the focal point on the projection surface due to the shift of the light path between the optical deflector mirror and the projection surface of the scanning light beam that is caused by the scanning operation of the light beam and an arc sine lens for correcting the distorted light spot due to the change in the angular velocity of the sine wave drive type optical deflector. While such an emitted light beam correcting optical system can correct the shift of the focal point in most of the scan area, it cannot correct it in peripheral areas. Therefore, only a central area where the optical system is effective for the correction is used for displaying an image.

Now, a method of driving a two-dimensional optical scanner according to the invention (a method of generating a synchronizing signal and a method of controlling the synchronism) will be described below.

In the mode of carrying out the invention which is described below, a two-dimensional image is displayed by causing a light beam that is modulated according to the image information applied thereto to scan both in a first direction x and in a second direction y. The scan speed of the light beam is made to change cyclically in the first direction x and the timing of scan of the light beam in the first direction x is detected as a result of detection of the light beam by a first photo-detector P arranged in a region where the scan speed of the light beam is highest in the first direction x within the detectable range of the scan speed of the light beam.

When the scan speed of the light beam is also made to change cyclically in the second direction y, preferably it may be so arranged that the timing of scan of the light beam in the second direction y is detected as a result of detection of the light beam by a second photo-detector Q arranged in a region where the scan speed of the light beam is highest in the second direction y within the detectable range of the scan speed of the light beam.

Then, preferably a two-dimensional image is displayed while the timing of scan of the light beam in the first direction x and the timing of scan of the light beam in the second direction y are synchronized.

Now, the method of driving the two-dimensional optical scanner will be described in detail by referring to FIG. 1.

<Two-Dimensional Scan of Light Beam>

The (modulated) light beam emitted from the light source 1 is made to scan in the first direction x and also in the second direction y as it is deflected by the first optical deflector A and also by the second optical deflector B to consequently display a two-dimensional image. The light source 1 is provided with a modulation means so that, when it receives a modulation start signal (which will be described in greater detail hereinafter) for image information, it starts modulating the image information transmitted to it and stored in a memory and carries out an operation of modulating the image information of a single horizontal line. The light beam is corrected by an emitted light beam correcting optical system after it is deflected by the second optical deflector B.

<Generation of Drive Timing Signal>

When the first photo-detector P detects the timing of scan of the light beam in the first direction x under this condition, the signal processing circuit 10 generates a drive timing signal 22 for the first optical deflector on the basis of the detection signal 20 from the first photo-detector P. Similarly, when the second photo-detector Q detects the timing of scan of the light beam in the second direction y, the signal processing circuit 10 generates a drive timing signal 23 for the second optical deflector on the basis of the detection signal 21 from the second photo-detector Q.

More specifically, the first photo-detector P detects the scanning light beam in an area where the rate of angular displacement of the first optical deflector A becomes highest (and that of the second optical deflector B becomes lowest) and generates a synchronizing signal for the optical deflector A, whereas the second photo-detector Q detects the scanning light beam in an area where the rate of angular displacement of the second optical deflector B becomes highest (and that of the first optical deflector A becomes lowest) and generates a synchronizing signal for the optical deflector B. Then, it is possible to detect the actual drive cycle and the actual drive timing of the first optical deflector A and those of the second optical deflector B.

<Synchronism Control of Optical Deflectors>

The signal processing circuit 10 synchronizes the drive timing signal 22 and the drive timing signal 23 in such a way that the cycle of driving the first optical deflector A is integer times as long as that of driving the second optical deflector B.

The drive timing signal 22 for the first optical deflector A is converted into a drive signal 25 for driving the first optical deflector A by the first optical deflector drive circuit 11 and hence the first optical deflector A is driven by the drive signal 25. Similarly, the drive timing signal 23 for the second optical deflector B is converted into a drive signal 26 for driving the second optical deflector B by the second optical deflector drive circuit 12 and hence the second optical deflector B is driven by the drive signal 26. Thus, the timing and the cycle of driving the first optical deflector A and those of driving the second optical deflector B are controlled respectively by the driving timing signals (synchronizing signals) 22 and 23.

<Generation of Modulation Start Signal>

Meanwhile, the above described signal processing circuit 10 generates a modulation start signal 24 for regulating the display area on the screen from the drive timing signal 22 of the first optical deflector A.

<Control by Modulation Start Signal>

Then, when the light source 1 provided with a modulation means receives the modulation start signal 24 for image information, it starts modulating the image information transmitted to it and stored in a memory and carries out an operation of modulating the image information of a single horizontal line. In other words, the timing of modulation of the light source 1 is controlled by the modulation start signal.

Now, the advantages of the above described mode of carrying out the invention will be discussed below.

Figure 15A:
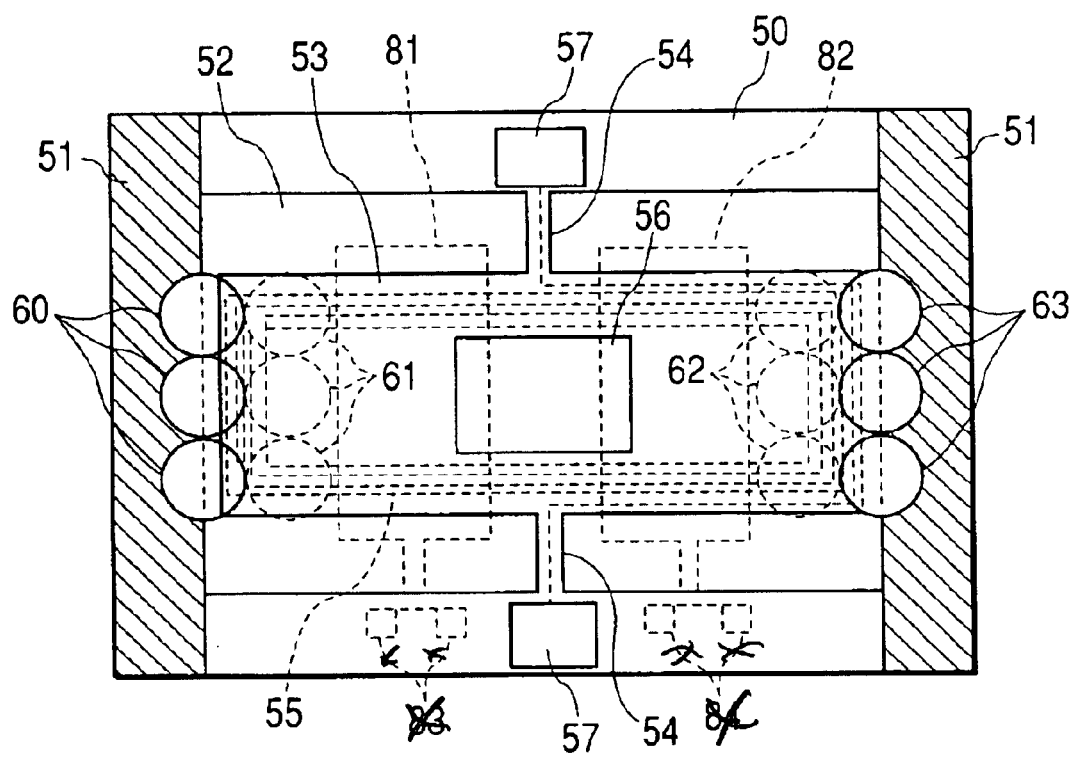
FIGS. 15A and 15B are schematic views of a micro-optical deflector, illustrating the configuration thereof in detail.
Figure 15B:
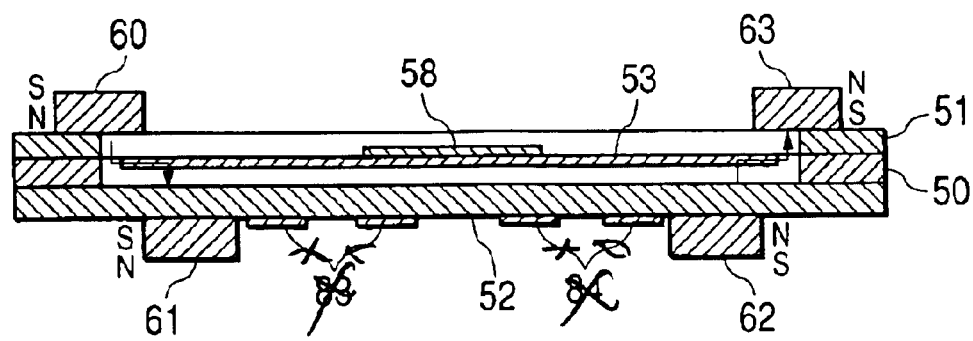
Figure 17:
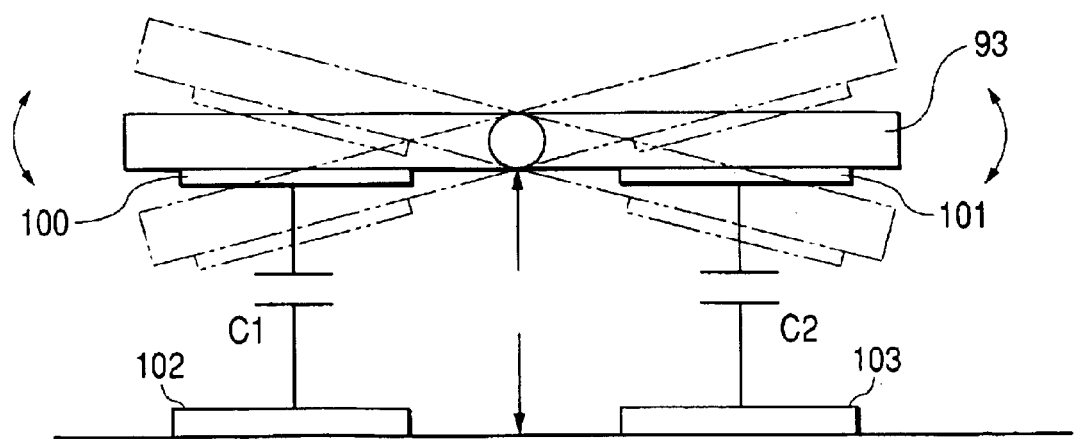
FIG. 17 is a schematic view of a known optical deflector, illustrating the configuration thereof.

With this mode of carrying out the invention, the first photo-detector P and the second photo-detector Q are adapted to directly detect the scanning light beam. Therefore, unlike detectors that utilize a detection coil (see FIGS. 15A and 15B) and those that utilize an electrostatic capacitance (see FIG. 17), the photo-detectors A and B can accurately detect the scanning light beam without requiring observation of their operation characteristics. Furthermore, while optical detectors that can be affected by distortion and/or shift from the axis of revolution of mirrors, the photo-detectors A and B are totally free from such problems and can accurately monitor the scanning light beam.

Additionally, since the first photo-detector P is arranged in a region where the scan speed of the light beam is highest in the first scanning direction x within the detectable range of the scan speed of the light beam, it is possible to accurately detect the timing of scan of the light beam with a minimal error in terms of detection time. Particularly, when the first photo-detector P is arranged in a region where the scan speed of the light beam is lowest in the second direction y, it can highly accurately and simply detect the timing of scan of the light beam in the first direction x without being affected by the scanning characteristics of the second optical deflector B in terms of jitter and wobble when the latter is driven to cause the light beam to scan. Then, it is possible to detect the actual drive cycle and the actual drive timing of each of the optical deflectors A and B and hence display a high quality image.

The above description of the advantages of the first photo-detector also applies to the second photo-detector Q. Thus, when the second photo-detector Q is arranged in a region where the scan speed of the light beam is highest in the second scanning direction y within the detectable range of the scan speed of the light beam, it is possible to accurately detect the timing of scan of the light beam with a minimal error in terms of detection time. Particularly, when the second photo-detector Q is arranged in a region where the scan speed of the light beam is lowest in the first direction x, it can highly accurately and simply detect the timing of scan of the light beam in the second direction y without being affected by the scanning characteristics of the first optical deflector A in terms of jitter and wobble when the latter is driven to cause the light beam to scan.

On the other hand, when the first photo-detector P and the second photo-detector Q are to be arranged between the surface where the scanning light beam is projected (as indicated by reference symbol 2 in FIG. 2) and the optical deflectors A and B or between the first optical deflector A and the second optical deflector B, the actual positions where they are placed respectively can be selected practically without restrictions. In other words, the entire optical scanner can be dimensionally down-sized.

When a plurality of first photo-detectors are arranged in a region where the scan speed of the light beam is highest in the first scanning direction x within the detectable range of the scan speed of the light beam (see reference symbols P, R in FIG. 8) and a plurality of second photo-detectors are arranged in a region where the scan speed of the light beam is highest in the second scanning direction y within the detectable range of the scan speed of the light beam (see reference symbols Q, W in FIG. 8), the timing of scan can be detected more accurately and it is possible to detect the actual drive cycle and the actual drive timing highly accurately on a stable basis.

With this mode of carrying out the invention the operations of the optical deflectors A and B can be synchronized regardless of the deflection characteristics of each of the optical deflectors so that it is possible to prevent any displacement of the displayed image and to display a high quality image. Furthermore, with a control method according to the invention, it is possible to drive optical deflectors that are adapted to be driven by a sinusoidal wave and hence to show easily changeable scanning characteristics or optical deflectors whose rate of angular displacement changes with time on a stable basis for two-dimensional scanning. Therefore, when the control method is used on a laser display, it can display a very high quality image.

Additionally, when the operation of an optical scanner according to the invention is controlled by means of a modulation start signal (to synchronize the modulation start signal for image information and the drive timing signal of the first optical deflector) in a manner as described above, the image display area can be typically so regulated on the display screen that the image can be displayed accurately in the area corrected by an emission correcting optical system. According to the invention, it is also possible to effectively detect and utilize non-image display areas where an image cannot be displayed because it cannot be optically corrected.

Now, the present invention will be described in greater detail by way of examples.

EXAMPLE 1

A projection type laser display (two-dimensional optical scanner) D1 having a configuration as shown in FIGS. 1 and 2 was prepared in this example.

More specifically, galvano-mirrors were used for the first optical deflector A1 and the second optical deflector B1, and the first optical deflector A1 was driven by a sinusoidal wave signal with a frequency of 10 kHz to cause a light beam to scan in a horizontal direction while the second optical deflector B1 was driven also by a sinusoidal wave signal with a frequency of 60 Hz to cause the light beam to scan in a vertical direction. A laser diode was used for the light source 1 and directly driven to emit a laser beam.

Meanwhile, a first photo-detector P is arranged at the middle of the upper edge of image forming region E (that is located in a region where the scan speed of the light beam is highest in the horizontal direction x and lowest in the vertical direction y within the detectable range of the scan speed of the light beam), whereas the second photo-detector Q is arranged at the middle of the left edge of image forming region E (that is located in a region where the scan speed of the light beam is highest in the vertical direction y and lowest in the horizontal direction x within the detectable range of the scan speed of the light beam).

The laser display of this example was driven to operate in a manner as described below.

The light beam emitted from (and modulated by) the light source 1 is deflected by the first optical deflector A1 and the second optical deflector B1 to scan both in the horizontal direction (first direction) x and in the vertical direction (second direction) y.

When the first photo-detector P detects the timing of scan of the light beam in the horizontal direction x and the second photo-detector Q detects the timing of scan of the light beam in the vertical direction y, they respectively generate detection signal 20 and detection signal 21 and transmit them to the signal pulse generator circuit 10, which convert the signals into information on the actual drive cycle and the actual drive timing. Then, drive timing signals 22 and 23 are generated on the basis of the information to synchronize the operation of the first optical deflector A1 and that of the second optical deflector B1. In other words, the drive cycle and the drive timing of the optical deflector A1 and those of the second optical deflector B1 are detected from the above detection signals 20 and 21.

Then, the drive timing signal 22 is converted into a drive signal 25 for driving the first optical deflector A1 by the first optical deflector drive circuit 11 so that the first optical deflector A1 is driven to operate by the drive signal. Similarly, the drive timing signal 23 is converted into a drive signal 26 for driving the second optical deflector B1 by the second optical deflector drive circuit 12 so that the second optical deflector B1 is driven to operate by the drive signal.

Meanwhile, the above described signal processing circuit 10 generates a modulation start signal 24 for regulating the area to be used for displaying an image on the basis of the drive timing signal 20 of the first optical deflector. Then, upon receiving a modulation signal for modulating image information, the light source 1 that is provided with a modulation means starts modulating the image information transmitted thereto and stored in a memory and carries out an operation of modulating the image information of a single horizontal line.

The projection type laser display of this example was able to display a high quality image regardless of the deflection characteristics of the optical deflectors.

EXAMPLE 2

A projection type laser display (two-dimensional optical scanner) D2 having a configuration as shown in FIG. 4 was prepared in this example.

More specifically, resonant optical deflectors were used for the first optical deflector A2 and the second optical deflector B2, and the first optical deflector A2 was driven by a sinusoidal wave signal with a frequency of 20 kHz to cause a light beam to scan in a horizontal direction while the second optical deflector B2 was driven also by a sinusoidal wave signal with a frequency of 120 Hz to cause the light beam to scan in a vertical direction. Otherwise, the configuration of the laser display and the method used for driving it were the same as those of Example 1.

The projection type laser display of this example provided the same advantages as those of the laser display of Example 1.

EXAMPLE 3

A projection type laser display (two-dimensional optical scanner) D3 having a configuration as shown in FIG. 5 was prepared in this example.

More specifically, the first optical deflector A3 and the second optical deflector B3 were arranged telescopically on a single substrate to produce an integral biaxial resonant optical deflector 30. The first optical deflector A3 was driven by a sinusoidal wave signal with a frequency of 20 kHz to cause a light beam to scan in a horizontal direction while the second optical deflector B3 was driven also by a sinusoidal wave signal with a frequency of 200 Hz to cause the light beam to scan in a vertical direction. Otherwise, the configuration of the laser display and the method used for driving it were the same as those of Example 1.

The projection type laser display of this example provided the same advantages as those of the laser display of Example 1.

EXAMPLE 4

Figure 8:
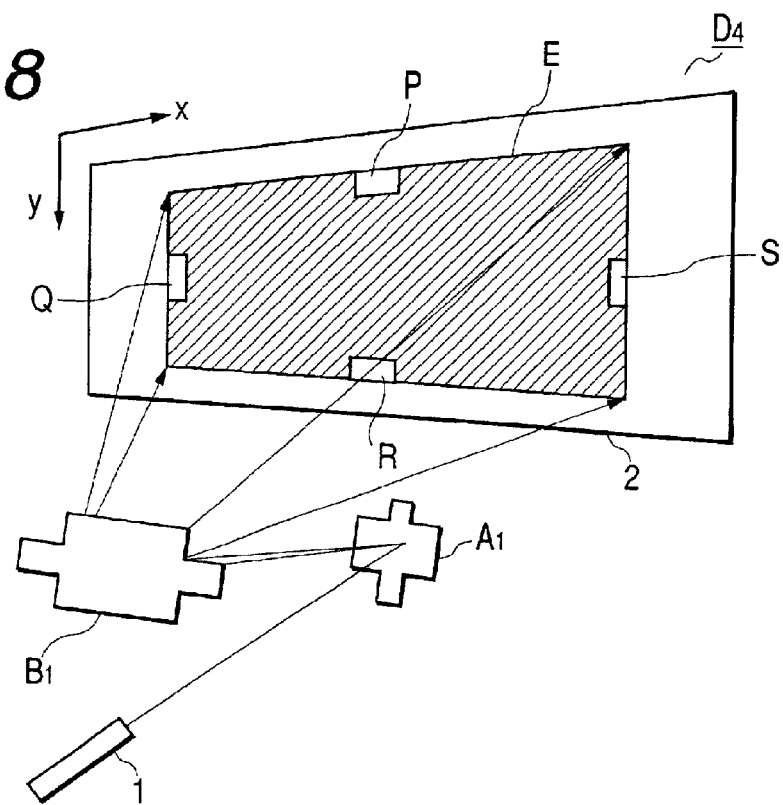
FIG. 8 is a schematic perspective view of a two-dimensional optical scanner according to the invention, illustrating the overall configuration thereof.

A projection type laser display (two-dimensional optical scanner) D4 having a configuration as shown in FIG. 8 was prepared in this example.

More specifically, beside the photo-detectors P, Q, another first photo-detector R was arranged at the middle of the lower edge of image forming region E (that is located in a region where the scan speed of the light beam is highest in the horizontal direction x and lowest in the vertical direction y within the detectable range of the scan speed of the light beam), whereas another second photo-detector S was arranged at the middle of the right edge of image forming region E (that is located in a region where the scan speed of the light beam is highest in the vertical direction y and lowest in the horizontal direction x within the detectable range of the scan speed of the light beam). Otherwise, the configuration of the laser display and the method used for driving it were the same as those of Example 1.

The laser display of the example was able to detect the actual drive cycle and the actual drive timing of each of the optical deflectors highly accurately (if compared with a laser display comprising only a single first photo-detector and a single second photo-detector) so that it was possible to perfectly synchronize the operation of the first optical deflector and that of the second optical deflector.

EXAMPLE 5

Figure 9:
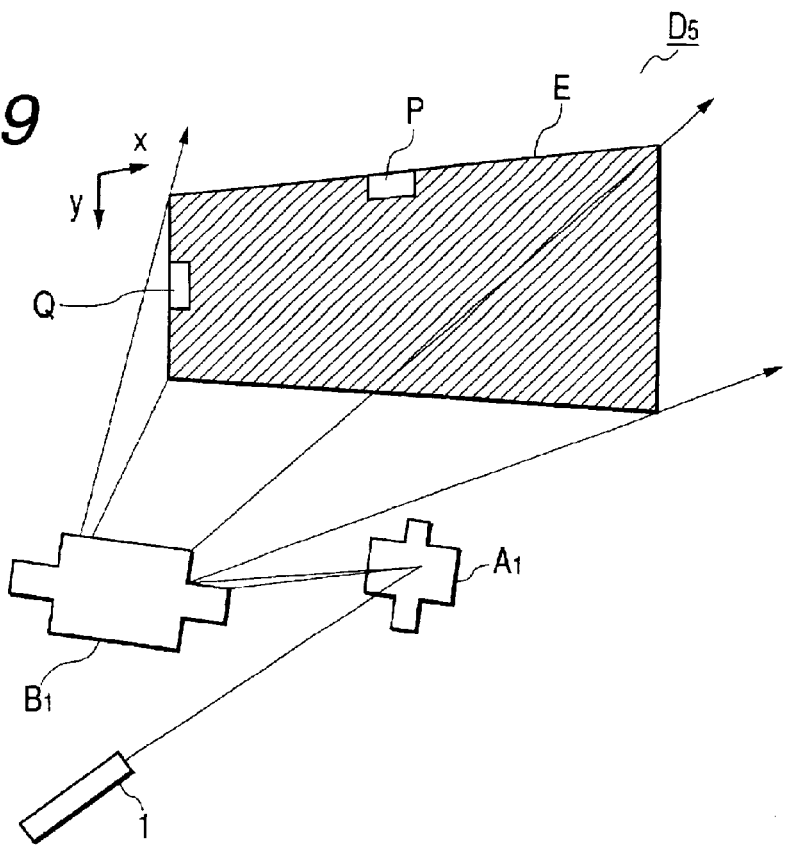
FIG. 9 is a schematic perspective view of a two-dimensional optical scanner according to the invention, illustrating the overall configuration thereof.
Figure 10:
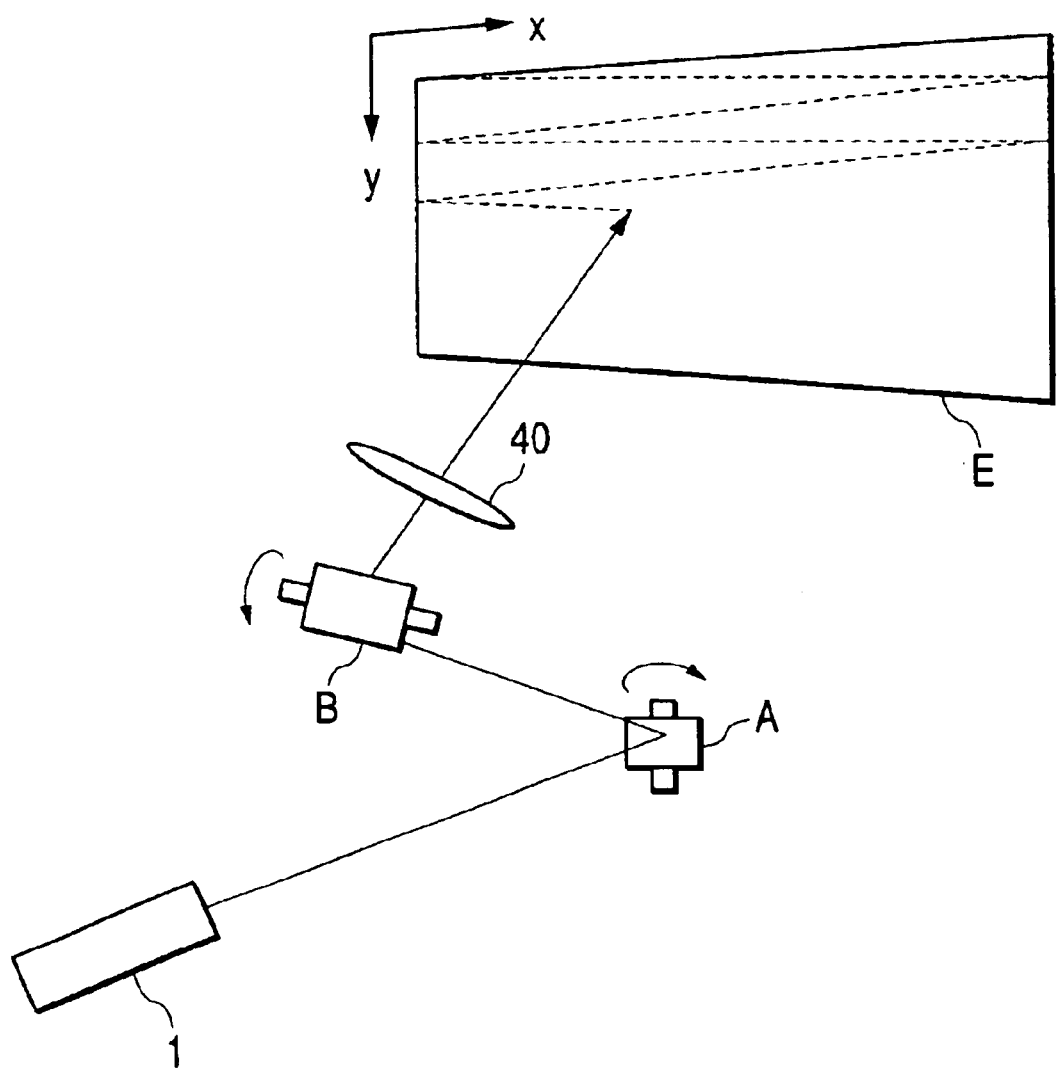
FIG. 10 is a schematic perspective view of a known two-dimensional optical scanner, illustrating the configuration thereof.
Figure 11A:
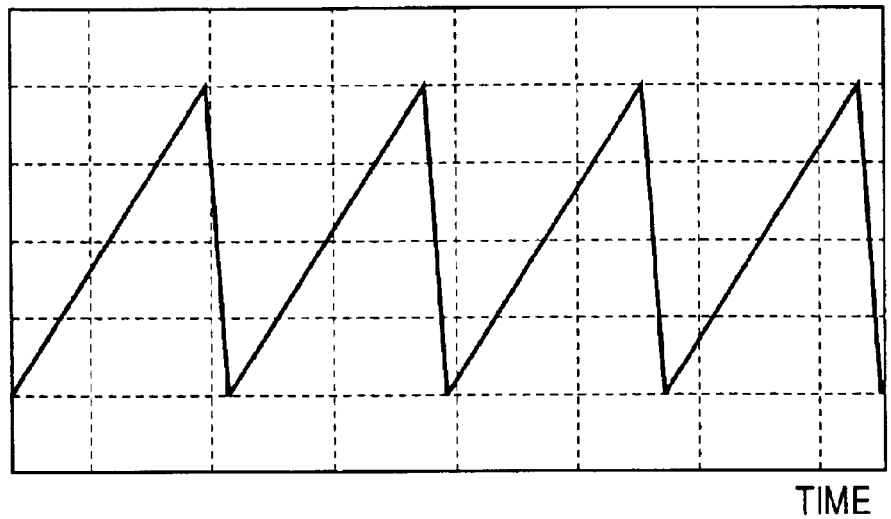
FIGS. 11A and 11B are graphs illustrating the waveforms of signals that can be used for driving an optical deflector.
Figure 11B:
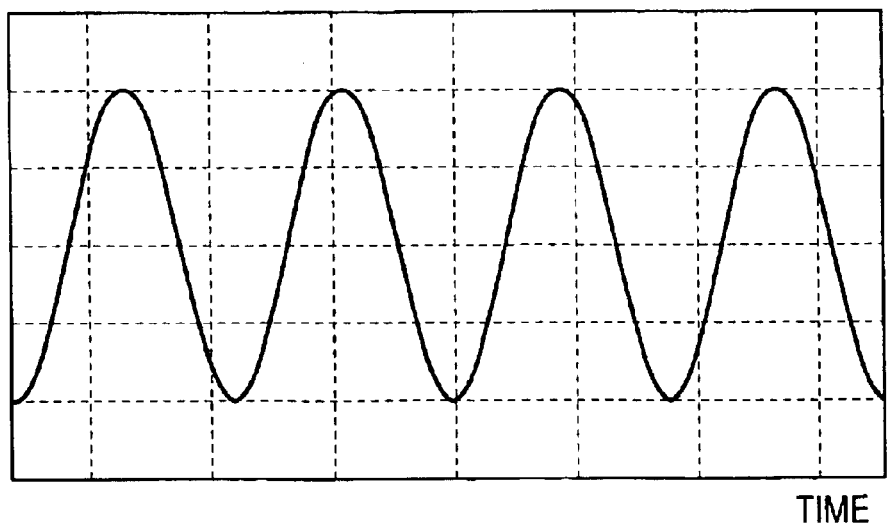
Figure 12:
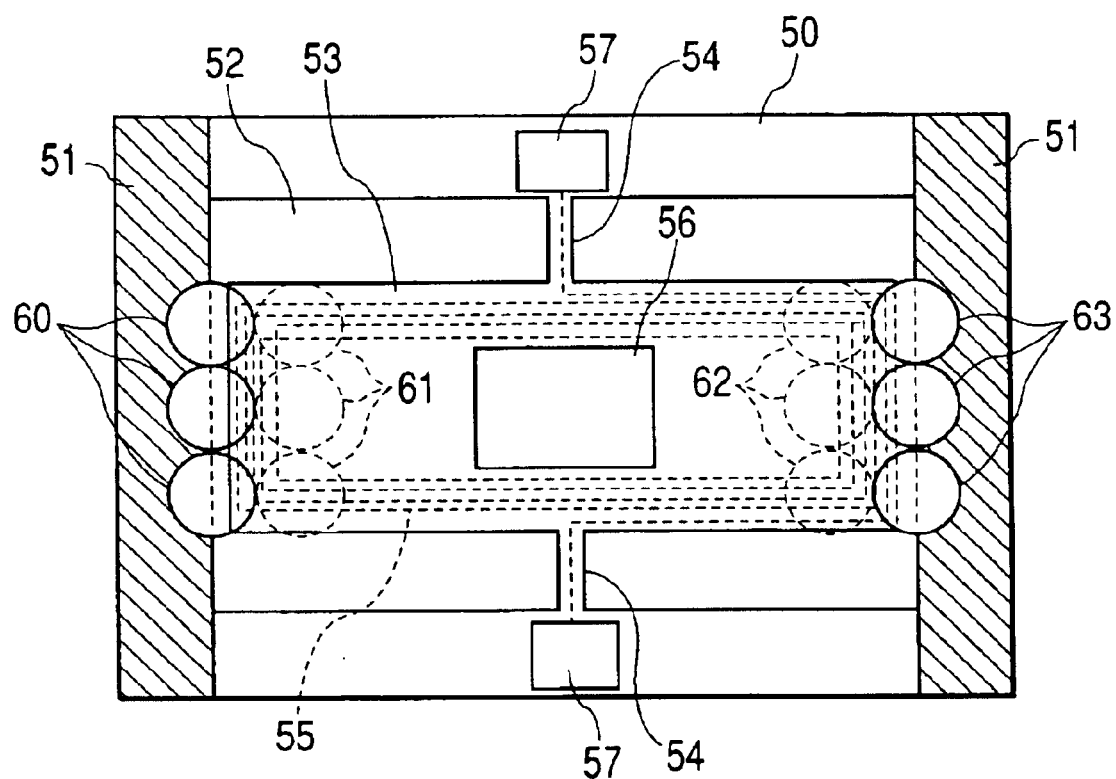
FIG. 12 is a schematic plan view of a known optical deflector (galvano-mirror), illustrating the configuration thereof.
Figure 13A:
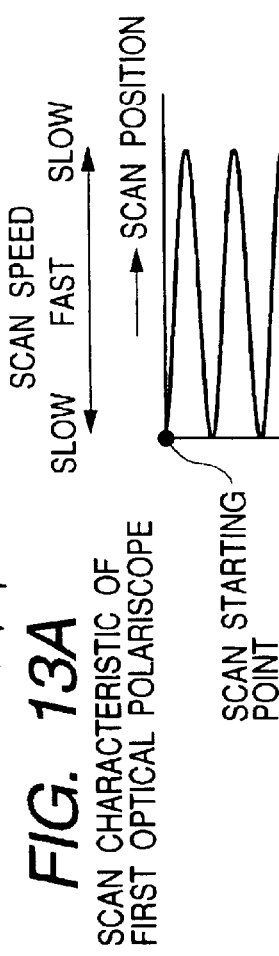
FIGS. 13A, 13B and 13C are graphs illustrating a scanning operation of a light beam.
Figure 13B:
Figure 13C:
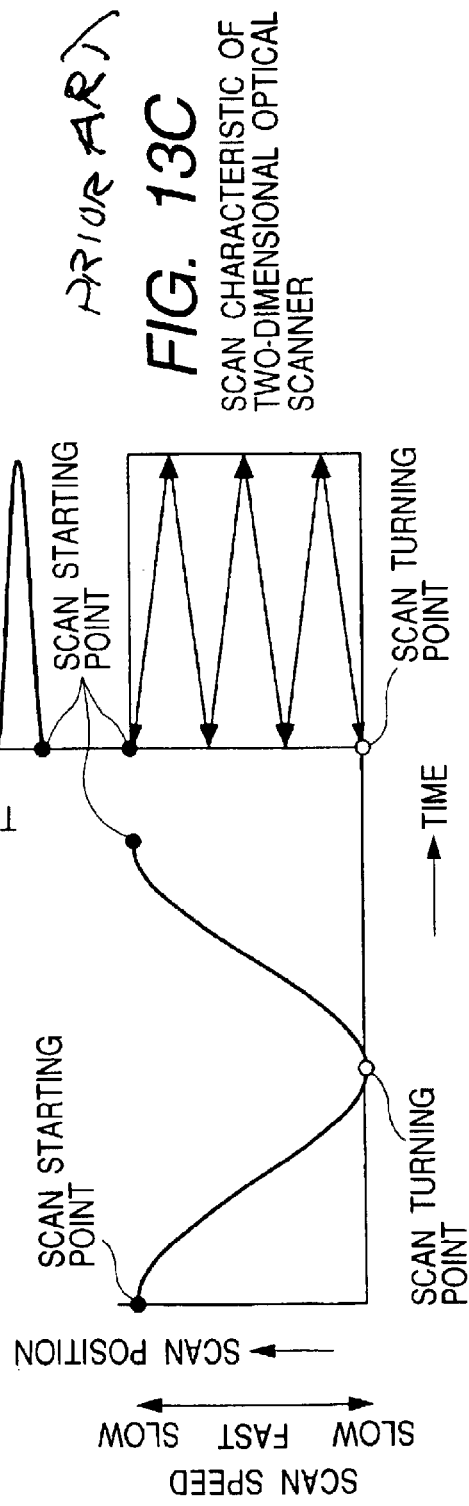
Figure 14:
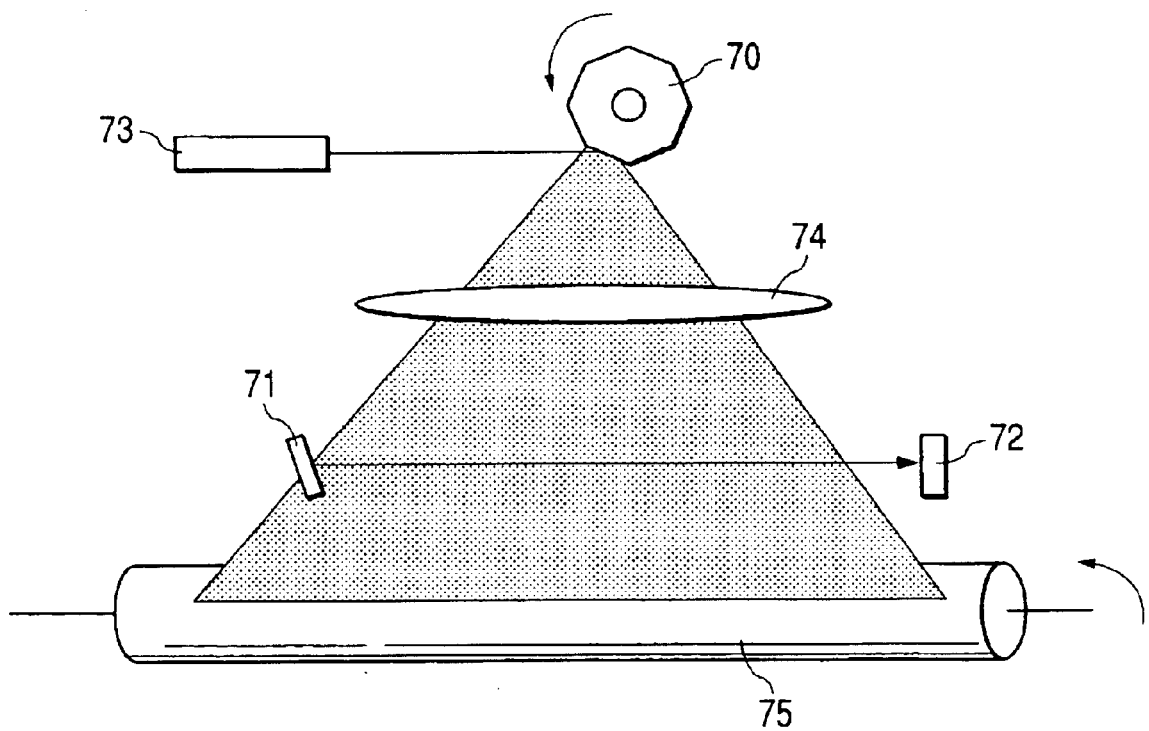
FIG. 14 is a schematic perspective view of a one-dimensional optical scanner, illustrating the overall configuration thereof.

A projection type laser display (two-dimensional optical scanner) D5 having a configuration as shown in FIG. 9 was prepared in this example.

More specifically, the first photo-detector P was arranged at the middle of the upper edge of a region F located between the light beam projection surface (see reference symbol 2 in FIG. 2) and the optical deflectors A1 and B1 and arranged in parallel with the image display region E (that is a region where the scan speed of the light beam is highest in the horizontal direction x and lowest in the vertical direction y within the detectable range of the scan speed of the light beam), whereas the second photo-detector Q was arranged at the middle of the left edge of the region F (that is a region where the scan speed of the light beam is highest in the vertical direction y and lowest in the horizontal direction x within the detectable range of the scan speed of the light beam).

The laser display of this example provides an advantage that the photo-detectors P, Q did not need to be arranged by taking the positional relationship between them and the projection surface E so that the actual drive cycle and the actual drive timing of each of the optical deflectors can be highly accurately detected only by the two-dimensional optical scanner alone and it was possible to perfectly synchronize the operation of the first optical deflector and that of the second optical deflector.

Figure 16:
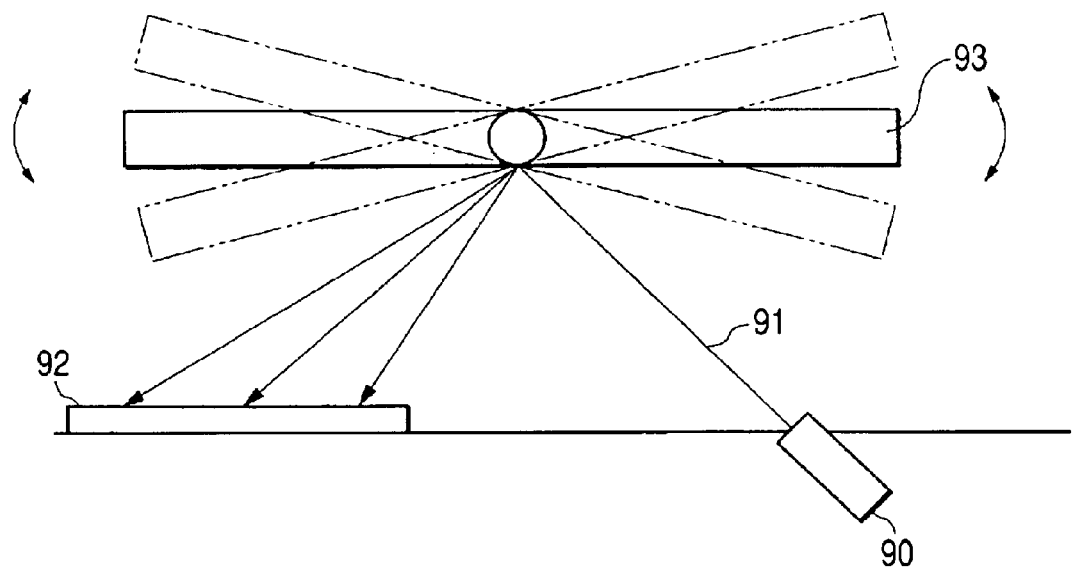
FIG. 16 is a schematic view of a known optical deflector, illustrating the configuration thereof.

As described above in detail, according to the invention, since the first photo-detector and the second photo-detector are adapted to directly detect the scanning light beam, unlike detectors that utilize a detection coil (see FIGS. 15A and 15B) and those that utilize an electrostatic capacitance (see FIG. 17), the photo-detectors A and B can accurately detect the scanning light beam without requiring observation of their operation characteristics. Furthermore, while optical detectors (see FIG. 16) that can be affected by distortion and/or shift from the axis of revolution of mirrors, the photo-detectors A and B are totally free from such problems and can accurately monitor the scanning light beam.

Additionally, since the first photo-detector is arranged in a region where the scan speed of the light beam is highest in the first scanning direction within the detectable range of the scan speed of the light beam, the error in the detection time is minimized to improve the accuracy of detection of the timing of scan of the light beam. Particularly, when the first photo-detector is arranged in a region where the scan speed of the light beam is lowest in the second direction, it can highly accurately and simply detect the timing of scan of the light beam in the first direction without being affected by the scanning characteristics of the second optical deflector B in terms of jitter and wobble when the latter is driven to cause the light beam to scan. Then, it is possible to detect the actual drive cycle and the actual drive timing of each of the optical deflectors and hence display a high quality image.

The above description of the advantages of the first photo-detector also applies to the second photo-detector.

Thus, when the second photo-detector is arranged in a region where the scan speed of the light beam is highest in the second scanning direction within the detectable range of the scan speed of the light beam, it is possible to accurately detect the timing of scan of the light beam with a minimal error in terms of detection time. Particularly, when the second photo-detector is arranged in a region where the scan speed of the light beam is lowest in the first direction, it can highly accurately and simply detect the timing of scan of the light beam in the second direction y without being affected by the scanning characteristics of the first optical deflector in terms of jitter and wobble when the latter is driven to cause the light beam to scan.

On the other hand, when the first photo-detector and the second photo-detector are arranged between the surface where the scanning light beam is projected and the optical deflectors or between the first optical deflector and the second optical deflector, the actual positions where they are placed respectively can be selected practically without restrictions. In other words, the entire optical scanner can be dimensionally down-sized.

When a plurality of first photo-detectors are arranged in a region where the scan speed of the light beam is highest in the first scanning direction x within the detectable range of the scan speed of the light beam and a plurality of second photo-detectors are arranged in a region where the scan speed of the light beam is highest in the second scanning direction within the detectable range of the scan speed of the light beam, the timing of scan can be detected more accurately and it is possible to detect the actual drive cycle and the actual drive timing highly accurately on a stable basis.

Additionally, according to the invention, the operations of the optical deflectors can be synchronized regardless of the deflection characteristics of each of the optical deflectors so that it is possible to prevent any displacement of the displayed image and display a high quality image. Furthermore, with a control method according to the invention, it is possible to drive optical deflectors that are adapted to be driven by a sinusoidal wave and hence show easily changeable scanning characteristics or optical deflectors whose rate of angular displacement changes with time on a stable basis for two-dimensional scanning. Therefore, when the control method is used with a laser display, it can display a very high quality image.

What is claimed is:

1. A two-dimensional optical scanner for displaying a two-dimensional image by causing a light beam scanning in a first direction to scan also in a second direction, comprising:

a first optical deflector to deflect the light beam in said first direction wherein the scan speed of the light beam in said first direction changes in each scan cycle;

a first photo-detector, for detecting the scanning light beam, arranged in a region where the scan speed of the light beam in said first direction is substantially equal to the highest speed thereof in said first direction; and a signal processing circuit for generating a drive timing signal for the first optical deflector on the basis of an output signal of the first photo-detector.

2. The optical scanner according to claim 1, wherein the scan speed of the light beam in said second direction also changes in each scan cycle, and said first photo-detector is arranged in a region where the scan speed of the light beam in said first direction reaches the highest speed thereof during scanning and the scan speed of the light beam in said second direction is substantially equal to the lowest speed thereof in the second direction.

3. The optical scanner according to claim 1, wherein the optical scanner further comprises:

a second optical deflector to deflect the light beam in said second direction, wherein the scan speed of the light beam in said second direction changes in each scan cycle;

a second photo-detector, for detecting the light beam in said second direction, arranged in a region where the scan speed of the light beam in said second direction is substantially equal to the highest speed thereof in the second direction and the scan speed of the light beam in said first direction is substantially equal to the lowest speed thereof in the first direction, and said signal processing circuit generates a drive timing signal for the second optical deflector on the basis of an output signal of the second photo-detector.

4. The optical scanner according to claim 1, wherein the scan speed of the light beam in said first direction is made to change in each cycle by causing a rate of angular displacement of said first optical deflector to change with time.

5. The optical scanner according to claim 4, wherein the angular displacement of said first optical deflector sinusoidally changes with time.

6. The optical scanner according to claim 4, wherein said first optical deflector is a galvano-mirror.

7. The optical scanner according to claim 4, wherein said first optical deflector is a resonant optical deflector.

8. The optical scanner according to claim 4, wherein the scan speed of the light beam in said second direction is made to change in each cycle by causing the rate of angular displacement of said second optical deflector to change with time.

9. The optical scanner according to claim 3, wherein said first and second optical deflectors are integrally arranged.

10. The optical scanner according to claim 9, wherein said optical deflection plane and a pair of optical deflection axes swingably supporting the optical deflection plane.

11. The optical scanner according to claim 10, wherein the optical deflection axes of said integrally formed first and second optical deflectors orthogonally intersect each other.

12. The optical scanner according to claim 3, wherein said first and second optical deflectors are micro-mirrors prepared by a semiconductor processing technology.

13. The optical scanner according to claim 3, wherein at least either said first photo-detector or said second photo-detector is arranged on a display surface for displaying a two-dimensional image by means of a scanning light beam.

14. The optical scanner according to claim 13, wherein at least either said first photo-detector or said second photo-detector is arranged outside an image-displaying region of a surface for displaying a two-dimensional image by means of a scanning light beam.

15. The optical scanner according to claim 3, wherein at least either said first photo-detector or said second photo-detector is arranged on a light path between a surface for displaying a two-dimensional image by means of a scanning light beam and the second optical deflector.

16. The optical scanner according to claim 1, wherein said signal processing circuit is adapted to generate a modulation start signal for image information on the basis of a drive timing signal for said first optical deflector.

17. A method of driving a two-dimensional optical scanner for displaying a two-dimensional image by causing a light beam scanning in a first direction to also scan in a second direction, at least the scan speed of the light beam in said first direction changing in each cycle;

a scan timing of the light beam in said first direction being detected on the basis of detection of the light beam by a first photo-detector arranged in a region where the scan speed of the light beam in the first direction is substantially equal to the highest speed thereof in said first direction.

18. The method according to claim 17, wherein the scan speed of the light beam in said second direction changes in each cycle, and the scan timing of the light beam in said second direction is detected on the basis of detection of the light beam by a second photo-detector arranged in a region where the scan speed of the light beam in the second direction is substantially equal to the highest speed thereof in said second direction.

19. The method according to claim 18, wherein a two-dimensional image is displayed by synchronizing the scan timing of the light beam in said first direction and that of the light beam in said second direction.

* * * * *